United States Patent
Hasunuma et al.

(10) Patent No.: US 12,162,151 B2
(45) Date of Patent: Dec. 10, 2024

(54) ROBOT CONTROL DEVICE, ROBOT SYSTEM AND ROBOT CONTROL METHOD

(71) Applicant: KAWASAKI JUKOGYO KABUSHIKI KAISHA, Kobe (JP)

(72) Inventors: Hitoshi Hasunuma, Kobe (JP); Takeshi Yamamoto, Kobe (JP); Kazuki Kurashima, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 505 days.

(21) Appl. No.: 17/419,011

(22) PCT Filed: Dec. 27, 2019

(86) PCT No.: PCT/JP2019/051495
§ 371 (c)(1),
(2) Date: Jun. 28, 2021

(87) PCT Pub. No.: WO2020/138446
PCT Pub. Date: Jul. 2, 2020

(65) Prior Publication Data
US 2022/0063091 A1    Mar. 3, 2022

(30) Foreign Application Priority Data
Dec. 27, 2018 (JP) .................... 2018-245481

(51) Int. Cl.
*B25J 9/16* (2006.01)
*B25J 9/00* (2006.01)

(52) U.S. Cl.
CPC ............. *B25J 9/163* (2013.01); *B25J 9/0081* (2013.01); *B25J 9/1633* (2013.01); *B25J 9/1687* (2013.01);
(Continued)

(58) Field of Classification Search
CPC ........ B25J 9/1612; B25J 9/0012; B25J 9/163; B25J 9/1646; B25J 9/1653; B25J 9/1664;
(Continued)

(56) References Cited

U.S. PATENT DOCUMENTS 10,807,233 B2 * 10/2020 Dani ................. G06V 40/28
10,856,945 B2 * 12/2020 Hashimoto ........... B25J 13/025
(Continued)

FOREIGN PATENT DOCUMENTS

| CN | 117280358 A | * 12/2023 | ........... B25J 9/1656 |
|----|-------------|-----------|------------------------|
| JP | H07-134605 A | 5/1995 | |
| JP | 2003311661 A | * 11/2003 | |

OTHER PUBLICATIONS

JP-2003311661-A translation (Year: 2003).*
(Continued)

*Primary Examiner* — Kyle T Johnson
(74) *Attorney, Agent, or Firm* — Oliff PLC

(57) ABSTRACT

A robot control device includes a modification work trained model building section. The modification work trained model building section builds a modification work trained model by training on modification work data when a user's modification operation is performed to intervene in a provisional operation of a robot arm to perform a series of operations. In the modification work data, input data is a state of the robot arm and its surroundings when the robot arm is operating and output data is data of the operation by a user for modifying the provisional operation or the modification operation of the robot arm by the user's operation for modifying the provisional operation.

6 Claims, 3 Drawing Sheets

(52) U.S. Cl.
CPC ............... *G05B 2219/36411* (2013.01); *G05B 2219/39001* (2013.01)

(58) Field of Classification Search
CPC ...... B25J 15/0009; B25J 15/12; B25J 9/1605; B33Y 80/00; B33Y 50/02
See application file for complete search history.

(56) References Cited

U.S. PATENT DOCUMENTS

| | | | | |
|---|---|---|---|---|
| 11,904,469 | B2* | 2/2024 | Tsuda | B25J 13/088 |
| 2014/0188281 | A1* | 7/2014 | Nagai | B25J 9/0081 |
| | | | | 700/264 |
| 2015/0094855 | A1* | 4/2015 | Chemouny | B25J 9/023 |
| | | | | 901/3 |
| 2015/0217449 | A1* | 8/2015 | Meier | G05D 1/0088 |
| | | | | 901/1 |
| 2015/0336267 | A1* | 11/2015 | Sun | G05B 19/0405 |
| | | | | 901/41 |
| 2015/0336268 | A1* | 11/2015 | Payton | G05B 19/423 |
| | | | | 901/3 |
| 2017/0061329 | A1* | 3/2017 | Kobayashi | G06N 20/00 |
| 2017/0320210 | A1* | 11/2017 | Ding | B25J 9/1687 |
| 2018/0164773 | A1* | 6/2018 | Wang | B25J 13/06 |
| 2018/0297204 | A1* | 10/2018 | Krasny | G05B 19/409 |
| 2019/0084151 | A1* | 3/2019 | Bai | B25J 9/1612 |
| 2019/0314992 | A1* | 10/2019 | Hashimoto | B25J 9/1671 |
| 2020/0014761 | A1* | 1/2020 | Kawaai | H04L 67/12 |
| 2020/0130184 | A1* | 4/2020 | Suzuki | B25J 9/1666 |
| 2020/0139539 | A1* | 5/2020 | Hasunuma | B25J 9/1664 |
| 2020/0171656 | A1* | 6/2020 | Diankov | B25J 9/1679 |
| 2020/0319627 | A1* | 10/2020 | Edwards | G05B 19/41885 |
| 2020/0353620 | A1* | 11/2020 | Hasunuma | B25J 19/023 |
| 2021/0003993 | A1* | 1/2021 | Hashimoto | G05B 19/4155 |

OTHER PUBLICATIONS

CN-117280358-A translation (Year: 2023).*
A Robot Learning From Demonstration Framework (Year: 2012).*
Feb. 25, 2020 International Search Report issued in International Patent Application No. PCT/JP2019/051495.

* cited by examiner

ROBOT CONTROL DEVICE, ROBOT SYSTEM AND ROBOT CONTROL METHOD

TECHNICAL FIELD

The present invention relates mainly to a robot control device that makes a robot perform work based on a trained model built by machine learning. In detail, the present invention relates to the building of the trained model.

BACKGROUND ART

Conventionally, a control target such as a robot is controlled by a program created in advance so that the control target performs the desired operation. For example, PTL 1 discloses a configuration in which a control unit of a robot includes a CPU, a ROM, and a RAM. The ROM stores a program for controlling the robot. The RAM stores a program written in a robot language for performing a work by the robot.

CITATION LIST

Patent Literature

PTL 1: Japanese Patent Application Laid-Open No. 7-134605 (1995)

SUMMARY OF THE INVENTION

Problems to be Solved by the Invention

In a conventional configuration, a program for operating a robot or the like is realized by a human understanding the work and programming how to operate it. However, such a method often requires time to create the program and to adjust it.

In recent years, machine learning has attracted a great deal of attention, as an alternative to programming, to automatically find laws and rules by iteratively training from information data, and to achieve functions similar to the natural learning ability of humans.

In such systems that use machine learning to control robot operation, a large amount of data for training is generally required. Therefore, when a human operation is the target of learning, the burden on the operator for data collection becomes large. Therefore, there has been a desire for a configuration that can achieve a high level of autonomous operation of a robot while reducing the burden on the operator.

The present invention was made in consideration of the above circumstances, and its object is to provide a robot control device, etc., which can make a robot perform an advanced operation while reducing the burden on an operator for training when the robot is operated based on a trained model that is trained on human operations.

Means for Solving the Problems

The problem to be solved by the present invention is as described above, and the means for solving the problem and the effect thereof are described below.

A first aspect of the present invention provides a robot control device configured as follows. That is, this robot control device controls a robot based on a result of predicting output data from input data using machine learning. The input data is a state of the robot and its surroundings when a human operates the robot so that the robot performs a series of operations. The output data is the corresponding human operation or an operation of the robot by the human operation. The robot control device includes a provisional operation information output section, a provisional control section, a modification work data collection section, a trained model building section, and a modified control section. The provisional operation information output section outputs provisional operation information for operating the robot provisionally to make the robot perform the series of operations. The provisional control section makes the robot perform the series of operations by controlling the robot based on the provisional operation information and causes a human to operate the robot to intervene in the provisional operation for modifying the provisional operation. The modification work data collecting section collects modification work data. The modification work data includes input data and output data. The input data is the state of the robot and its surroundings when the human operates the robot to intervene in the provisional operation by the provisional control section so as to modify the provisional operation. The output data is data indicating the corresponding human operation for modifying the provisional operation or a modification operation of the robot by the human operation for modifying the provisional operation. The trained model building section builds a trained model by training on the modification work data. The modified control section controls the robot based on the provisional operation information and applies the output data output by the trained model to control the robot when the state of the robot and its surroundings is input to the trained model as the input data.

This allows the human to concentrate on the operation of modifying the provisional movements performed by the robot when building the trained model. Therefore, the burden of the operation can be reduced and high-quality work data for training can be obtained. Thus, even if the human is not skilled in the operation, control closer to the ideal can be easily achieved.

A second aspect of the present invention provides a robot control method as follows. That is, in this robot control method, a robot is controlled based on a result of predicting output data from input data using machine learning. The input data is a state of the robot and its surroundings when a human operates the robot so that the robot performs a series of operations. The output data is the corresponding human operation or an operation of the robot by the human operation. The robot control method includes a provisional operation information output step, a provisional control step, a modification work data collection step, a trained model building step, and a modified control step. In the provisional operation information output step, provisional operation information is output for operating the robot provisionally to make the robot perform the series of operations. In the provisional control step, the robot is controlled based on the provisional operation information so that the robot performs the series of operations, and a human is made to operate the robot to intervene in the provisional operation for modifying the provisional operation. In the modification work data collection step, modification work data which is to be trained by a training model is collected. In this training model, the input data is the state of the robot and its surroundings when the human operates the robot to intervene in the provisional operation by the provisional control step so as to modify the provisional operation. The output data is data indicating the corresponding human operation for modifying the provisional operation or a modification operation of the robot by the human operation for modifying the provisional operation. In the trained model building step, a trained model is built by training the modification work data to the training model. In the modified control step, the robot is controlled based on the provisional operation information and the output data output by the trained model is applied to a control of the robot when the state of the robot and its surroundings is input to the trained model as the input data.

This allows the human to concentrate on the operation of modifying the provisional movements performed by the robot when building the trained model. Therefore, the burden of the operation can be reduced and high-quality work data for training can be obtained. Thus, even if a user is not skilled in the operation, control closer to the user's ideal can be easily achieved.

Effects of the Invention

According to the present invention, when operating a robot based on a trained model which is trained on human operations, the robot can be made to perform advanced operations while reducing the burden on the operator for training.

EMBODIMENT FOR CARRYING OUT THE INVENTION

Figure 1:
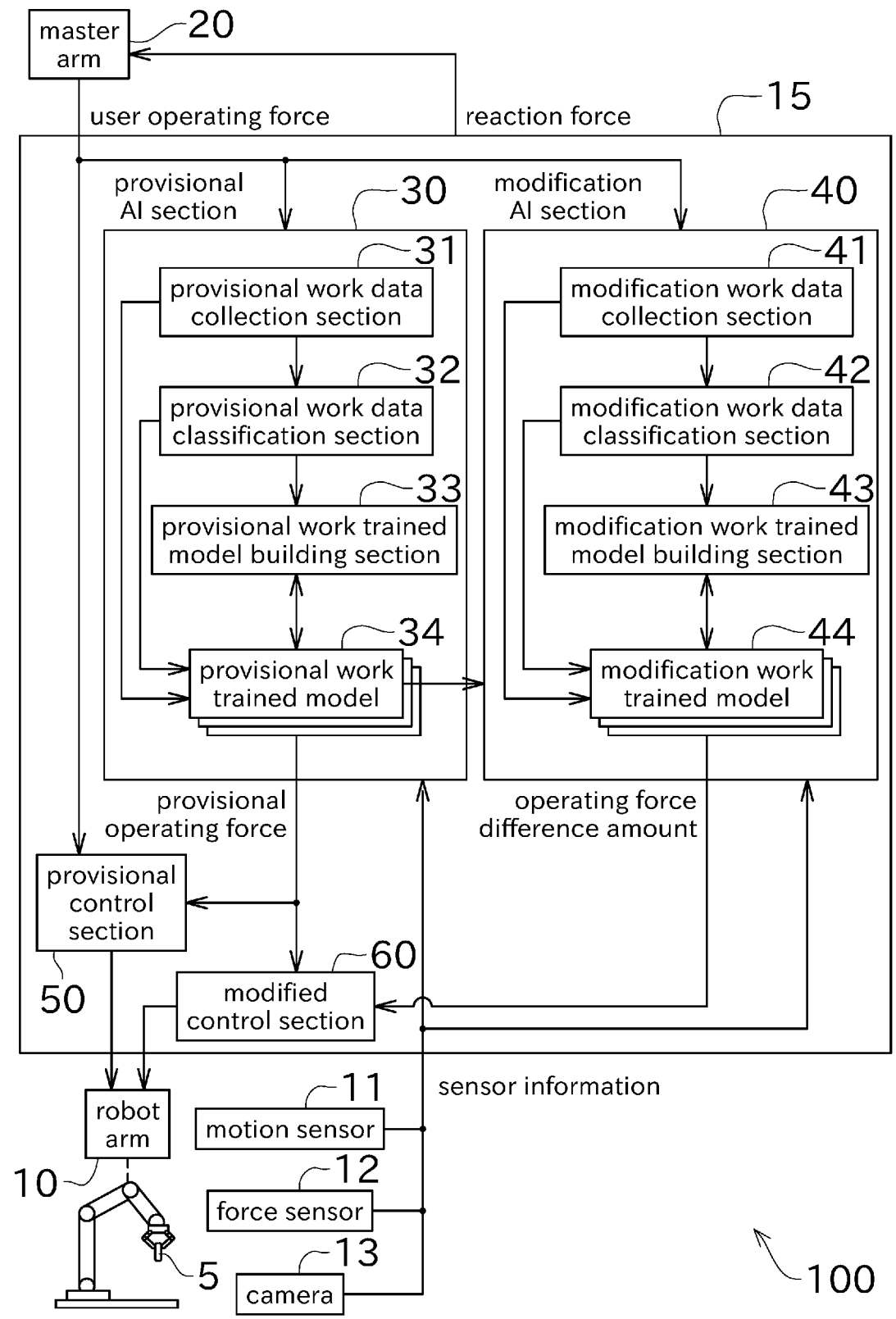
FIG. 1 is a block diagram showing the configuration of the robot system of this embodiment.

Next, an embodiment of the present invention will be described with reference to the drawings. FIG. 1 is a block diagram showing a configuration of a robot system 100 of the present embodiment.

The robot system 100 of the present embodiment shown in FIG. 1 is a system that makes a robot arm (robot) 10 perform a work autonomously. This work varies and may be welding, assembly, handling, painting, cleaning, polishing, or the like.

The robot system 100 includes the robot arm 10, a master arm 20, and a robot control device 15. The robot arm 10, the master arm 20, and the robot control device 15 are connected to each other by wired or wireless means and can exchange signals.

The robot control device 15 can operate the robot arm 10 and can switch between a manual operation mode and an autonomous operation mode. In the manual operation mode, a user (human) manually operates the master arm 20 to operate the robot arm 10. In the autonomous operation mode, the robot arm 10 is automatically operated based on the results of prior learning of the operation of the robot arm 10 by manual operation.

The robot arm 10 can be configured, for example, as a vertical articulated robot with 6 degrees of freedom of movement. The robot arm 10 includes an arm unit attached to a pedestal. The arm unit has a plurality of joints. Each joint is provided with an actuator (e.g., an electric motor, not shown) for driving the arm unit around the joint. At the end of the arm unit, an end-effector is attached according to the work to be performed. The end-effector acts in direct contact with a workpiece 5.

The arm unit and the end-effector of the robot arm 10 operate based on a movement command, which is control data for operating the robot arm 10.

A motion sensor 11, a force sensor 12, and a camera 13 are attached to the robot arm 10. These sensors are capable of detecting the state of the robot arm 10 and its surroundings.

The motion sensor 11 is used to detect the motion of the robot arm 10. The motion sensor 11 is provided at each joint of the arm unit of the robot arm 10 and detects the rotation angle or angular velocity of each joint.

The force sensor 12 can detect a reaction force received by the end-effector from the external environment (specifically, the workpiece 5 or the like). The robot arm 10 is moved by the combined force of the reaction force applied from the external environment and the force applied by actuators (not shown) for driving each joint of the robot arm 10.

The camera 13 is provided for detecting an image or the like of the workpiece 5. The workpiece is to be worked on. Various information can be obtained by image processing the images captured by the camera 13. The information obtained based on the camera 13 includes the position of another member 6 into which the workpiece 5 is to be inserted, the relative position of the workpiece 5 and the member 6, and the like. The information obtained based on the camera 13 includes information about the position and posture of the robot arm 10 and the position and movement speed of the workpiece 5.

Instead of or in addition to the camera 13, a sound sensor for detecting sound, a vibration sensor for detecting vibration, or the like can be provided as needed to obtain information about the surroundings of the robot arm 10.

The robot system 100 includes the master arm 20 as an operation unit that can be operated by the user. The master arm 20 is disposed of at a physically remote location from the robot arm 10.

In a manual operation mode, the robot system 100 operates the robot arm 10 as a slave arm to trace the movements of the master arm 20 operated by the user (master-slave teleoperation). Thereby, the user can operate the robot arm 10 based on the operation of the master arm 20 to perform various works.

The master arm 20, like the robot arm 10, is configured as a known articulated robot. Each joint of the master arm 20 is provided with an actuator (e.g., an electric motor, not shown) for driving the arm unit around the said joint.

An operating force detection sensor, not shown, is provided in the master arm 20. The operating force detection sensor is capable of detecting an operating force applied by the user to the master arm 20. The operating force is a value including the direction and magnitude of the force and can be expressed, for example, by a vector. The master arm 20 is moved by the combined force of the operating force applied by the user and the force applied by the actuator described above. This allows the user to feel as if he or she is in contact with the actual working environment of the robot arm 10.

The robot control device 15 is configured with a known computer, including a CPU, a ROM, a RAM, and an HDD. It is preferable if the robot control device 15 further includes a GPU, as it enables learning by the neural network described below to be performed in a short time. Various software is stored in the HDD, etc. by performing an installation process in advance. The software includes a control application and a data collection application. The control application is for controlling the robot arm 10 and the master arm 20. The data collection application is for collecting various data for building a provisional work trained model 34 and a modification work trained model 44.

In the manual operation mode, the robot control device 15 drives the actuators of the robot arm 10 to trace the movement of the master arm 20 caused by the user's operating force, while driving the actuators of the master arm 20 to transmit the reaction force received by the robot arm 10. This realizes interactive operation, and the user can remotely control the robot arm 10 using the master arm 20 in real-time while feeling the force sensation simulated through the master arm 20.

Images captured by the camera 13 are transmitted in real-time to a display, not shown, installed in the vicinity of the master arm 20. The user can operate the master arm 20 while checking the situation by looking at the images on the display.

As shown in FIG. 1, the robot control device 15 includes a provisional AI section (provisional operation information output section) 30, a modification AI section 40, a provisional control section 50, and a modified control section 60. Specifically, the robot control device 15 can be operated as the provisional AI section 30, the modification AI section 40, the provisional control section 50, and the modified control section 60 through the cooperation of hardware such as a CPU provided by the robot control device 15 and software such as the control application described above.

The provisional AI section 30 realizes a provisional operation information output step of the robot control method. The provisional AI section 30 includes a provisional work data collection section 31, a provisional work data classification section 32, a provisional work trained model building section 33, and a provisional work trained model 34.

When the user operates the master arm 20 to make the robot arm 10 perform a series of operations to be trained, the provisional work data collection section 31 collects data related to the operations.

As will be described in detail below, the work of the robot arm 10 realized by the provisional AI section 30 is treated as provisional. Accordingly, in the following, the data collected by the provisional work data collection section 31 may be referred to as provisional work data.

Figure 2:
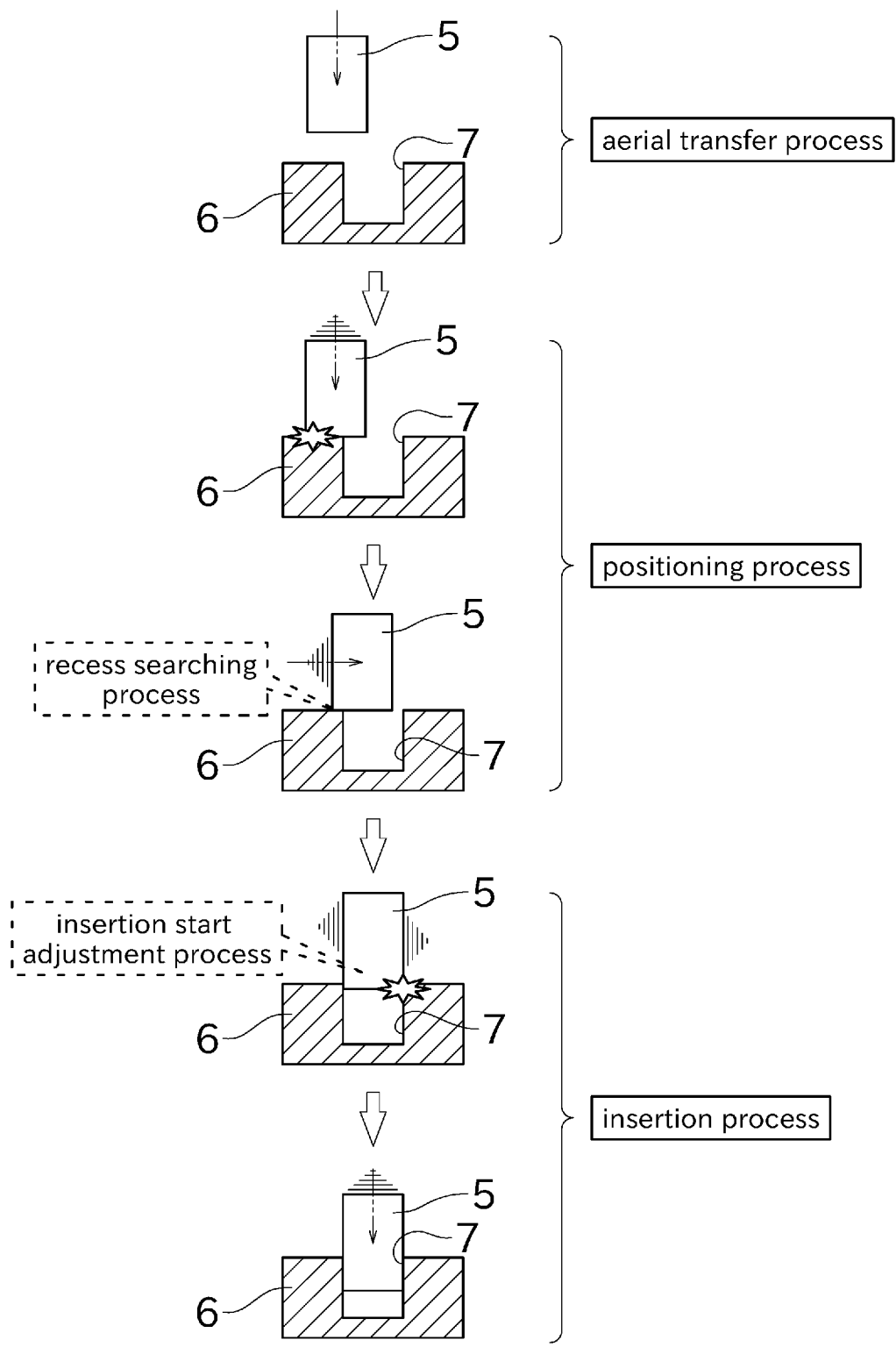
FIG. 2 is a schematic diagram showing an example of a series of operations to be accomplished during an autonomous operation of a robot control device.

A series of operations can be arbitrarily defined, but a certain degree of complexity is assumed. For example, a series of operations may include the work of inserting the workpiece 5 into an accommodation recess 7 of the another member 6, as shown in FIG. 2. In FIG. 2, the robot arm 10 grabs the workpiece 5 is omitted.

The provisional work data includes detection values of the state of the robot arm 10 and its surroundings detected by the motion sensor 11, the force sensor 12, the camera 13, and the like. In the following, these detected values may be collectively referred to as "sensor information". The sensor information indicates the state of the robot arm 10 and its surroundings. Further, the provisional work data includes the detected values of the operating force applied by the user to the master arm 20 by the operating force detection sensor. In the following, the operating force applied by the user to the master arm 20 may be referred to as the "user operating force". The detected value of the user operating force by the operating force detection sensor indicates the operation of the user.

The provisional work data changes in response to changes in the state of the robot arm 10 and its surroundings. In the process of the user operating the master arm 20 to make the robot arm 10 perform a series of operations, the provisional work data is acquired repeatedly at predetermined time intervals (time intervals corresponding to a sampling frequency described below).

Each time the provisional work data is acquired, the provisional work data collection section 31 adds, for example, a timestamp to the provisional work data. In this way, the time-series order of the provisional work data can be expressed.

The set of provisional work data collected by the provisional work data collection section 31 is used as training data for constructing the provisional work trained model 34. Details are described below.

The provisional work data classification section 32 performs classification on the provisional work data collected by the provisional work data collection section 31.

The provisional work data classification section 32 classifies the provisional work data using, for example, a clustering method such as a known NN method, a K-Means method, and a self-organizing map. Clustering is a method for automatically acquiring a plurality of clusters, each of which is a group of data having similar characteristics to each other. This acquisition is by learning law of distribution from a plurality of data. The number of clusters into which the provisional work data is classified can be determined appropriately. The classification of the provisional work data can also be performed using an automatic classification method other than clustering.

A synthesis of the states of the robot arm 10 and its surroundings, and the corresponding operations performed by the user on the master arm 20 (hereinafter referred to as a situation) is considered to be characterized by each scene in which a series of operations is broken down in chronological order. Since the situation is represented by the provisional work data described above, the situations of the robot arm 10 can be classified by performing appropriate clustering on the provisional work data.

As a result of the above, a series of operations indicated by the provisional work data collected is classified into a plurality of work processes. For example, consider a case in which the provisional work data acquired in a series of operations of inserting the workpiece 5 into the accommodation recess 7 is classified into three work processes shown in FIG. 2 as a result of clustering. In the following, the three work processes may be referred to as an aerial transfer process, a positioning process, and an insertion process.

In the aerial transfer process, the robot arm 10 holds the workpiece 5 and positions it in the upper vicinity of the accommodation recess 7. In the aerial transfer process, the workpiece 5 and the member 6 in which the accommodation recess 7 is formed are not in contact with each other.

In the positioning process, the workpiece 5 held by the robot arm 10 is moved to a position where the workpiece 5 fits into the accommodation recess 7 while contacting the surface of the member 6 on which the accommodation recess 7 is formed.

In the insertion process, the robot arm 10 inserts the workpiece 5 into the accommodation recess 7 by adjusting the positional relationship between the workpiece 5 and the accommodation recess 7 so that the workpiece 5 can be smoothly inserted into the accommodation recess 7.

The provisional work trained model building section 33 builds provisional work trained models 34 by machine learning (supervised learning). The same number of the provisional work trained models 34 are provided as the work processes in which the series of operations are classified.

Each of the plurality of models is trained on only the provisional work data classified into the cluster of the corresponding work process. That is, in the provisional AI section 30, provisional work trained models 34, each of which is specific to each work process, are built. This makes it easier to converge the learning in a short time because the training target of each model can be limited.

The format of each provisional work trained model 34 is arbitrary. In the present embodiment, the provisional work trained model 34 is a neural network of a general configuration having an input layer, a hidden layer, and an output layer. Each layer has a plurality of units that simulate brain cells. A hidden layer is placed between the input layer and the output layer, and this hidden layer has an appropriate number of intermediate units. Information flows in the order of the input layer, the hidden layer, and the output layer. The number of hidden layers can be determined as appropriate.

In this model, the data input to the input layer (input data) is the sensor information described above. As described above, the sensor information is data that indicates the state of the robot arm 10 and its surroundings. The data output by the output layer (output data) is the predicted result of the detection value of the operating force detection sensor, which means, in effect, the user operating force which is predicted. Thus, the output data represents the human operation predicted by the model.

Each input unit and each intermediate unit are coupled to each other by paths through which information flows, and each intermediate unit and each output unit are coupled to each other by paths through which information flows. In each path, the influence (weight) of the information of the upstream unit on the information of the downstream unit is set.

In the training phase, the provisional work trained model building section 33 inputs sensor information to the model and compares the operating force output from the model with the user operating force. The provisional work trained model building section 33 updates the above-described weights by the error backpropagation method, which is a known algorithm, so that the error obtained by the comparison becomes small. By continuously performing the above process, learning can be achieved.

While the provisional work trained model 34 is trained, the provisional AI section 30 performs an appropriate thinning-out process on the provisional work data collected by the provisional work data collection section 31, and converts the data so that the sampling frequency becomes smaller. In addition, the provisional AI section 30 removes information on the detected value of the force sensor 12 from the sensor information included in the provisional work data. In this way, since the data to be trained becomes summary and the force-sensing element is removed from the data, the time required for machine learning can be appropriately reduced.

The provisional work trained model 34 built as described above is capable of outputting an operating force for controlling the operation of the robot arm 10 so as to roughly reflect each of the operations in each work process.

In the inference phase, the provisional AI section 30 determines what cluster the input sensor information is classified into in the provisional work data classification section 32, based on the clustering results described above. Thereby, the work process corresponding to the sensor information can be obtained. Thereafter, the sensor information is input to the provisional work trained model 34 corresponding to the obtained work process among the plurality of provisional work trained models 34. The provisional work trained model 34 predicts and outputs the user operating force accordingly. In the following, the user operating force predicted and output by the provisional work trained model 34 may be referred to as the provisional operating force.

As a result, the provisional work trained model 34 can output a provisional operating force for controlling the robot arm 10 so as to make the robot arm 10 perform the work shown in FIG. 2 approximately. In other words, the output of the provisional work trained model 34 defines a rough movement trajectory of the tip of the robot arm 10. Accordingly, the provisional operating force can be regarded as information (provisional operation information) for provisionally moving the robot arm 10 to make it perform a series of operations.

As described above, the provisional work trained model 34 is trained on the provisional work data in a form that omits the detected values of the force sensor 12. On the other hand, the provisional work data classification section 32 performs clustering on the provisional work data in a form that includes the detected values of the force sensor 12 as part of the features. As a result, the work processes can be classified well taking into account the force factors that are considered to be important factors characterizing each scene of the work. In the inference phase of the provisional AI section 30, the work process corresponding to the current sensor information is obtained based on the above clustering results, taking into account the detected value of the force sensor 12 included in the sensor information. Accordingly, the provisional AI section 30 can accurately obtain the work process corresponding to the sensor information and appropriately select the provisional work trained model 34 that outputs the provisional operating force.

In this embodiment, the user operates the master arm 20 in two stages. The operation of the master arm 20 for the training of the provisional AI section 30 corresponds to the first stage of operation. Due to the nature that the provisional work trained model 34 of the provisional AI section 30 is trained on a rough operation, in the first stage, the operation of the master arm 20 is not focused on precisely performing the operation shown in FIG. 2, and can be somewhat rough. The user who operates the master arm 20 in the first stage and in the second stage described below may be a different person.

In the inference phase, the provisional work trained model 34 outputs the provisional operating force, which is predicted, to the provisional control section 50 and the modified control section 60.

The provisional control section 50 realizes the provisional control step of the robot control method. The provisional control section 50 controls the robot arm 10 by combining the autonomous work of the robot arm 10 and the manual work of the robot arm 10 by the user's operation. Specifically, the provisional control section 50 generates a movement command to make the robot arm 10 perform a motion that is a composite of the motion based on the provisional operation force output by the provisional work trained model 34 and the motion based on the operation performed by the user on the master arm 20. The provisional control section 50 outputs the generated movement commands to the robot arm 10.

As a result, control that makes the robot arm 10 autonomously perform a series of operations is achieved. However, the operation of the robot arm 10 at this time is based on the output (provisional operating force) of the provisional work trained model 34, which has been trained on simplified data, and is therefore in broad strokes. The operation of the robot arm 10 is understood as a draft-like operation that is planned to be modified. In the middle of the operations, the user can intervene in the above autonomous operation in real-time by operating the master arm 20 as needed, and manually modify the operation of the robot arm 10.

In a series of operations, there is a part that requires particularly delicate operations or flexible operations in response to the situation. For example, in the example of the series of operations shown in FIG. 2, in the second to fourth states from the top, adjustment of the amount of force and fine adjustment of the position are required depending on the positional relationship between the workpiece 5 and the other member 6. In such a part, failure of the work frequently occurs if the robot arm 10 operates in broad strokes. As an example of the modification work, it is considered to modify such an operation so that it becomes a delicate or flexible operation. The operation of the master arm 20 at this time corresponds to the second stage of the two-stage operation of the master arm 20 described above.

If the user operates the master arm 20 to modify the operation of the robot arm 10 while the provisional control section 50 is making the robot arm 10 perform a series of operations, the operation by the user is trained by the modification AI section 40. This detail will be described later.

The modification AI section 40 includes a modification work data collection section 41, a modification work data classification section 42, a modification work trained model building section (trained model building section) 43, and a modification work trained model (trained model) 44.

The modification work data collection section 41 realizes the modification work data collection step of the robot control method. The modification work data collection section 41 collects modification work data in the case the user operates the master arm 20 to modify the operation of the robot arm 10.

In the modification work data, the above-described sensor information is input data and the data about the operation performed by the user on the master arm 20 at this time (specifically, an operating force difference amount described below) is output data. The modification work data collection section 41 acquires a series of modification work data in a form capable of expressing a time series as with the provisional work data collection section 31.

The set of modification work data collected by the modification work data collection section 41 is used as training data for building the modification work trained model 44. Details are described below.

The modification work data classification section 42 performs classification on the modification work data collected by the modification work data collection section 41. This classification can be performed using an appropriate clustering method as in the provisional work data classification section 32. The number of clusters into which the modification work data is classified can be determined as appropriate.

As described above, the operations indicated by the modification work data which is corrected are classified as appropriate. For example, consider a case in which the modification work data is classified into two adjustment processes, which are indicated by dashed lines in FIG. 2. In the following, the two adjustment processes may be referred to as the recess searching process and the insertion start adjustment process.

The recess searching process is a process in which the workpiece 5 held by the robot arm 10 is moved along a surface while being pressed with a small force against a surface of the member 6 where the accommodation recess 7 is formed, and a position where the workpiece 5 exactly matches the accommodation recess 7 is found by relying on a sense of a reaction force or the like. In this process, the force to press the workpiece 5 against the member 6 is adjusted according to the reaction force so that the workpiece 5 or the like is not damaged when the workpiece 5 is slid along the member 6.

The insertion start adjustment process is a process if there is a feeling of catching when the workpiece 5 is started to be inserted into the accommodation recess 7. In this process, while changing the posture and position of the workpiece 5 little by little, a state in which the feeling of catching is eliminated is searched for.

The modification work trained model building section 43 realizes the trained model building step of the robot control method. The modification work trained model building section 43 builds a modification work trained model 44. The same number of the modification work trained models 44 are provided as the adjustment processes in which the modification work data described above is classified.

Each of the plurality of models is trained on only the modification work data classified into the cluster of the corresponding adjustment process. Accordingly, modification work trained models 44, each of which is specific to each adjustment process, are built. By limiting the target of training, it is easier to converge the learning in a short time, as with the provisional work trained model 34.

The format of each modification work trained model 44 is arbitrary. In the present embodiment, a neural network having an input layer, a hidden layer, and an output layer is used.

Figure 3:
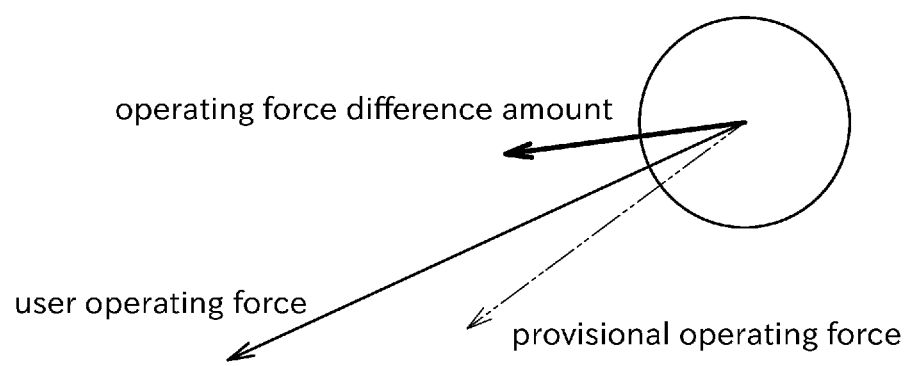
FIG. 3 is a diagram showing a relationship between a modified operating force and a provisional operating force.

In this model, the data input to the input layer (input data) is the sensor information described above. The data output by the output layer (output data) is a difference amount obtained by subtracting the operating force corresponding to the original operation (in other words, the provisional operating force output by the provisional work trained model 34) from the user operating force operated by the user to modify the operation. Hereafter, this difference amount may be referred to as the "operating force difference amount". FIG. 3 schematically shows the relationship between the user operating force, the provisional operating force, and the operating force difference amount.

In the training phase of the modification work trained model 44, the modification work trained model building section 43 inputs sensor information to the model and compares the operating force differential amount output from the model with the operating force difference amount which is computed (supervised learning).

For computing this operating force difference amount, the provisional AI section 30 operates in an inference phase. The sensor information same as to be input to the modification work trained model 44 for training is input to the provisional AI section 30. The provisional work trained model 34 outputs a provisional operating force in response to this sensor information to the modification AI section 40.

The modification work trained model building section 43 of the modification AI section 40 updates the weights given by the information of the upstream units to the information of the downstream units in the model by the error back-propagation method so that the error obtained by the above computation is reduced. By continuously performing the above process, learning can be achieved.

In the inference phase, first, it is determined what cluster the sensor information input to the modification AI section 40 is classified by the modification work data classification section 42. Thereby, the adjustment process corresponding to the sensor information can be obtained. Thereafter, the sensor information is input to the modification work trained model 44 corresponding to the obtained adjustment process. The modification work trained model 44 predicts and outputs the operating force difference amount accordingly.

Unlike the case of the provisional work trained model 34, when the modification work trained model 44 is trained, the modification AI section 40 does not perform the conversion of the sampling frequency of the modification work data. Also, information about the detected value of the force sensor 12 is not removed from the modification work data. Therefore, the modification work trained model 44 can properly be trained on delicate and complex operations based on rich information that also includes force factors.

The modification work trained model 44 built as described above is capable of outputting the operating force difference amount for controlling the operation of the robot arm 10 so as to reproduce the operation of the adjustment process. As a result, the operation which is difficult with only the provisional operating force by the provisional work trained model 34, for example, fine adjustment of the operation taking into account the positional relationship between the workpiece 5 and the opening of the accommodation recess 7, the positional relationship between the workpiece 5 and the inner wall of the accommodation recess 7, and the like, can be appropriately realized.

The modified control section 60 realizes the modified control step of the robot control method. The modified control section 60 controls the robot arm 10 by synthesizing the output of the provisional work trained model 34 and the output of the modification work trained model 44. In other words, the modified control section 60 controls the robot arm 10 based on the provisional operating force output by the provisional work trained model 34, and also applies the operating force difference amount output by the modification work trained model 44 to control the robot arm 10. The modified control section 60 generates a movement command for operating the robot arm 10 as with the provisional control section 50. The modified control section 60 outputs the movement command which is generated to the robot arm 10.

As a result, the robot arm 10 operates based on the operating force that is a composite of the provisional operating force from the provisional work trained model 34 and the operating force difference amount (modified operating force) from the modification work trained model 44. Accordingly, autonomous work can be performed well even if there is a part among a series of operations that requires a delicate or flexible operation.

In the robot control device 15 of the present embodiment, rough operations and delicate operations are separately trained, and respective trained models (the provisional work trained model 34 and the modification work trained model 44) are built. By this categorization, detailed training for an unimportant part can be avoided. Therefore, the machine learning to realize a series of operations can be performed more efficiently. In addition, when building the modification work trained model 44 (i.e., when the user operates the master arm 20 in the second stage described above), the user can concentrate only on delicate work. As a result, high-quality modification work data (data of user operating force) can be obtained and the user's burden with the operation can be reduced.

In the present embodiment, the operation of the master arm 20 is made as a two-step process. Therefore, the adjustment process for realizing a relatively advanced operation can be partially extracted from a series of operations. In addition, in the present embodiment, the adjustment processes extracted in this manner are classified, and a modification work trained model 44 specialized for each adjustment process is built. Moreover, each of the modification work trained models 44 outputs the predicted modification operation in the form of a difference amount with respect to the operating force before the adjustment.

For example, if a series of operations about two workpieces which include inserting a large workpiece into a large recess and inserting a small workpiece into a small recess is considered, a plurality of situations similar to each other appear in the process. Therefore, it is considered that a common modification work trained model 44 can apply to these operations. As a result, the range of utilization of the modification work trained model 44 can be expanded, and the time required for the overall learning can be significantly reduced.

It is preferred that the modification work trained model 44 is trained on the operating force difference amount in each adjustment process as relative to, for example, the direction of the detected force. Accordingly, for example, the recess searching process and the insertion start adjustment process shown in FIG. 2 can be performed not only for the vertically oriented accommodation recess 7 but also for the horizontally oriented accommodation recess. As a result, the modification work trained model 44 can be utilized more flexibly.

As described above, the robot control device 15 of the present embodiment controls the robot arm 10 based on a result of predicting output data from input data using machine learning. The input data is the state of the robot arm 10 and its surroundings when the user operates the robot arm 10 so that the robot arm 10 performs the series of operations. The output data is the corresponding operation by the user. The robot control device 15 includes the provisional AI section 30, the provisional control section 50, the modification work data collection section 41, the modification work trained model building section 43, and the modified control section 60. The provisional AI section 30 outputs the provisional operating force for operating the robot arm 10 provisionally to make the robot arm 10 perform the series of operations. The provisional control section 50 makes the robot arm 10 perform the series of operations by controlling the robot arm 10 based on the provisional operating force, and causes the user to operate the robot arm 10 to intervene in the provisional operation of the robot arm 10 for modifying the provisional operation. The modification work data collecting section 41 collects modification work data. The modification work data includes input data and output data. The input data is the state of the robot arm 10 and its surroundings when the user operates the robot arm 10 so as to intervene in the provisional operation by the provisional control section 50 so as to modify the provisional operation. The output data is the operating force difference amount indicating the corresponding operation by the user modifying the provisional operation. The modification work trained model building section 43 builds the modification work trained model 44 by training on the modification work data. The modified control section 60 controls the robot arm 10 based on the provisional operating force. The modified control section 60 applies to the control of the robot arm 10 the operating force difference amount output by the modification work trained model 44 when the state of the robot arm 10 and its surroundings is input to the modification work trained model 44 as the input data.

This allows the user to concentrate on the operation of modifying the provisional movements performed by the robot arm 10 when building the modification work trained model 44. Therefore, the burden of the operation can be reduced and high-quality modification work data for training can be obtained. Thus, even if the user is not skilled in the operation, control closer to the user's ideal can be easily achieved.

Also, in the robot control device 15 of the present embodiment, the operation for modifying the provisional operation (the operating force difference amount) represented by the output data of the modification work trained model 44 is the difference amount with respect to the user's operation (in other words, the provisional operating force) represented by the provisional operation information.

As a result, the operation for modifying the provisional operation, output by the modification work trained model 44, can be easily applied to the user's operation about the provisional operation. In addition, the reusability of the modification work trained model 44 can be enhanced.

Also, in the robot control device 15 of the present embodiment, the provisional AI section 30 outputs the provisional operating force output by the provisional work trained model 34 which is built. The provisional work trained model 34 is built by training on provisional work data. The provisional work data includes input data and output data. The input data is the states of the robot arm 10 and its surroundings when the user operates the robot arm 10 so that the robot arm 10 performs the series of operations. The output data is the corresponding operation by the user.

As a result, by using machine learning for each of the rough operations of the robot arm 10 and the detailed operations to modify the rough operations, the robot arm 10 can be accurately controlled as a whole.

Also, in the robot control device 15 of the present embodiment, the input data of the provisional work data trained by the provisional work trained model 34 does not include the result of detecting an influence about force perception generated on the robot arm 10 by the force sensor 12. On the other hand, the input data of the modification work data trained by the modification work trained model 44 includes the result of detecting the influence about force perception generated on the robot arm 10 by the force sensor 12.

By training that takes the influence about force perception into account only for the modification operation, control that requires a delicate sense can be realized without much increase in the overall learning effort.

Also, in the robot control device 15 of the present embodiment, based on the results of clustering based on features of the modification work data, each of the modification work trained models 44 is built by being trained on the modification work data for each adjustment process which is represented by a respective cluster. Based on the result of clustering based on features of the provisional work data, each of the provisional work trained model 34 is built by being trained on the provisional work data for each operation process which is represented by a respective cluster.

This allows the modifications (i.e., adjustment processes) output by the modification work trained model 44 for the original operation to be commonly applied to a plurality of situations that are similar to each other. Thus, for example, when a plurality of states similar to each other appear in the provisional operation, the same modification work trained model 44 can be applied to each of them. Therefore, the learning effort can be reduced. In addition, in the case a series of operations different from those trained in the past is to be trained, and when some of the states between the series of operations trained in the past and the series of operations to be trained in the future are similar to each other, modifications based on the modification work trained model 44 trained in the past can be applied to the current training. In this way, the modification work trained model 44 can be flexibly utilized.

Also, the robot system 100 of the present embodiment includes the robot control device 15 and the robot arm 10.

As a result, the training of a series of operations that take into account delicate or flexible operations can be performed efficiently as a whole.

Also, in the present embodiment, the robot arm 10 is controlled by the following method. This robot control method includes a provisional operation information output step, a provisional control step, a modification work data collection step, a trained model building step, and a modified control step. In the provisional operation information output step, provisional operation information is output for operating the robot arm 10 provisionally to make the robot arm 10 perform the series of operations. In the provisional control step, the robot arm 10 is controlled based on the provisional operation information so that the robot arm 10 performs the series of operations, and the user is made to operate the robot arm 10 to intervene in the provisional operation for modifying the provisional operation. In the modification work data collection step, modification work data which is to be trained by a training model is collected. In this training model, the input data is a state of the robot and its surroundings when the human operates the robot arm 10 to intervene in the provisional operation by the provisional control step so as to modify the provisional operation. The output data is the operating force difference amount indicating the corresponding operation by the user for modifying the provisional operation. In the trained model building step, the modification work trained model 44 is built by training the modification work data to the training model. In the modified control step, the robot arm 10 is controlled based on the provisional operation information. In the modified control step, the output data output by the modification work trained model 44 to the control of the robot arm 10 when the state of the robot arm 10 and its surroundings is input to the modification work trained model 44 as input data.

This allows the user to concentrate on the operation of modifying the provisional movements performed by the robot arm 10 when building the modification work trained model 44. Therefore, the burden of the operation can be reduced and high-quality modification work data for training can be obtained. Thus, even if the user is not skilled in the operation, control closer to the user's ideal can be easily achieved.

Although a suitable embodiment of the present invention has been described above, the above configuration can be modified, for example, as follows.

The operating force may be expressed in terms of acceleration instead of the force applied by the user. The operating force may also include a moment, for example.

The provisional work trained model 34 may be configured to be trained on a relationship between the sensor information and a provisional movement command to the robot arm 10, instead of being trained on the relationship between the sensor information and the provisional operating force. In this case, the movement command corresponds to the provisional operation information. This movement command, in effect, indicates the operation of the robot arm 10.

Similarly, the modification work trained model 44 may be configured to be trained on a relationship between the sensor information and a difference amount of the movement command, instead of being trained on the relationship between the sensor information and the operating force difference amount.

The modification work trained model 44 may be trained on the user operating force itself performed for the modification or the movement command itself caused by the user operating force, instead of being trained in the form of the difference amount with the output of the provisional AI section 30, and output it to the modified control section 60.

Instead of inserting the workpiece 5 into the accommodating recess 7, the robot control device 15 can also perform other works.

The part corresponding to the provisional AI section 30 can be modified to output provisional operation information by some method other than AI. For example, if the robot control device 15 has an off-line teaching function that uses a 3D model, the user specifies a trajectory for moving the workpiece 5 using the above-described function. The teaching result output section, which is provided instead of the provisional AI section 30, calculates the operating force of the master arm 20 necessary to realize the above trajectory, and outputs this as the provisional operating force.

The thinning-out of the provisional work data or the removal of the data of the influence about force perception used for training the provisional work trained model 34 in the provisional AI section 30 may be omitted.

Instead of the master arm 20, an operating lever, a foot-operated pedal, or the like may be used.

The part of the provisional work data and the modification work data that pertain to output data (user operation) may be obtained by means other than the operation of the master arm 20. For example, a measurement sensor or the like may be attached to the user's hand or arm to directly measure the user's operation and collect information such as position and posture. Also, the robot system 100 may include a camera or the like capable of capturing the user, and the position and posture, etc. obtained by indirectly measuring the user's motion may be used.

The virtual environment in which the user can operate may be provided by a simulation. In this configuration, the user may contact the virtual environment via a suitable manipulation device. The user operates the operation device according to the force and positional information given to the user by the operation device. As a result, the provisional work data and the modification work data can be collected.

DESCRIPTION OF THE REFERENCE NUMERALS 10 robot arm (robot)
15 robot control device
30 provisional AI section (provisional operation information output section)
41 modification work data collection section
43 modification work trained model building section (trained model building section)
44 modification work trained model (trained model)
50 provisional control section
60 modified control section

The invention claimed is:

1. A robot control device for controlling a robot based on a result of predicting output data from input data using machine learning, the input data being a state of the robot and its surroundings when a human operates the robot so that the robot performs a series of operations, the output data being the corresponding human operation or an operation of the robot by the human operation, the robot control device comprising:
    a provisional operation information output section which outputs provisional operation information for operating the robot provisionally to make the robot perform the series of operations;
    a provisional control section which makes the robot perform the series of operations by controlling the robot based on the provisional operation information, and causes a human to operate the robot to intervene in the provisional operation for modifying the provisional operation;
    a modification work data collection section which collects modification work data including input data and output data, the input data being the state of the robot and its surroundings when the human operates the robot to intervene in the provisional operation by the provisional control section so as to modify the provisional operation, the output data being data indicating the corresponding human operation for modifying the provisional operation or a modification operation of the robot by the human operation for modifying the provisional operation;
    a trained model building section which builds a trained model by training on the modification work data; and
    a modified control section which controls the robot based on the provisional operation information and applies the output data output by the trained model to a control of the robot when the state of the robot and its surroundings is input to the trained model as the input data, wherein
    the human operation for modifying the provisional operation or the modification operation represented by the output data of the trained model is a difference amount with respect to the human operation or the operation of the robot represented by the provisional operation information.

2. The robot control device according to claim 1, wherein the provisional operation information output section outputs the provisional operation information using an output of a provisional work trained model which is a training model built, and
the provisional work trained model is built by being trained on provisional work data including input data and output data, the input data being the state of the robot and its surroundings when the human operates the robot so that the robot performs the series of operations, the output data being the corresponding human operation or an operation of the robot by the human operation.

3. The robot control device according to claim 2, wherein the input data of the provisional work data trained by the provisional work trained model does not include a result of detecting an influence about force perception on the robot, and
the input data of the modification work data trained by the trained model includes a result of detecting an influence about force perception on the robot.

4. The robot control device according to claim 2, wherein based on a result of clustering based on features of the modification work data, each of the trained models is built by being trained on the modification work data for each adjustment process which is represented by a respective cluster, and
based on a result of clustering based on features of the provisional work data, each of the provisional work trained models is built by being trained on the provisional work data for each operation process which is represented by a respective cluster.

5. A robot system comprising:
the robot control device according to claim 1; and
the robot.

6. A robot control method for controlling a robot based on a result of predicting output data from input data using machine learning, the input data being a state of the robot and its surroundings when a human operates the robot so that the robot performs a series of operations, the output data being the corresponding human operation or an operation of the robot by the human operation, the robot control method comprising:
- a provisional operation information output step for outputting provisional operation information for operating the robot provisionally to make the robot perform the series of operations;
- a provisional control step for making the robot perform the series of operations by controlling the robot based on the provisional operation information, and for causing a human to operate the robot to intervene in the provisional operation for modifying the provisional operation;
- a modification work data collection step for collecting modification work data which is to be trained by a training model, the modification work data including input data and output data, the input data being the state of the robot and its surroundings when the human operates the robot to intervene in the provisional operation by the provisional control step so as to modify the provisional operation, the output data being data indicating the corresponding human operation for modifying the provisional operation or a modification operation of the robot by the human operation for modifying the provisional operation;
- a trained model building step for building a trained model by training the modification work data to the training model; and
- a modified control step for controlling the robot based on the provisional operation information and for applying the output data output by the trained model to a control of the robot when the state of the robot and its surroundings is input to the trained model as the input data, wherein the human operation for modifying the provisional operation or the modification operation represented by the output data of the trained model is a difference amount with respect to the human operation or the operation of the robot represented by the provisional operation information.

* * * * *